United States Patent [19]

Taniwa

[11] Patent Number: 5,538,490
[45] Date of Patent: Jul. 23, 1996

[54] SAFETY BAR MECHANISM AND SHEET PROCESSING DEVICE HAVING A SAFETY BAR MECHANISM

[75] Inventor: Tatsuhiro Taniwa, Hyogo, Japan

[73] Assignee: Fujitsu Limited, Kanagawa, Japan

[21] Appl. No.: 570,833

[22] Filed: Dec. 12, 1995

Related U.S. Application Data

[63] Continuation of Ser. No. 114,169, Sep. 1, 1993, abandoned.

[30] Foreign Application Priority Data

Feb. 15, 1993 [JP] Japan .................................. 5-025745

[51] Int. Cl.⁶ .............................. D01G 31/00; F16D 7/00; B21D 55/00
[52] U.S. Cl. ................................ 493/27; 493/38; 74/612; 192/133; 192/129 R; 19/.2; 33/62
[58] Field of Search ........................... 493/38, 27, 412; 271/220, 152, 176, 215; 62/342; 92/2; 19/.2202; 366/2.86; 83/62, 310; 74/612; 192/133, 129

[56] References Cited

U.S. PATENT DOCUMENTS

| | | | |
|---|---|---|---|
| 3,498,217 | 3/1970 | Kletti | 74/612 X |
| 3,641,841 | 2/1972 | Komori | 74/615 |
| 3,815,440 | 6/1974 | Mikulin | 74/612 |
| 3,987,881 | 10/1976 | Perkins | 74/612 |
| 4,041,765 | 8/1977 | Kemper | 72/389 X |
| 4,282,963 | 8/1981 | Kafura et al. | 192/133 |
| 4,416,035 | 11/1983 | Schwartz | 74/612 |
| 4,454,631 | 6/1984 | Schwartz | 74/612 |

*Primary Examiner*—Jack W. Lavinder
*Assistant Examiner*—Christopher W. Day
*Attorney, Agent, or Firm*—Nikaido, Marmelstein, Murray & Oram

[57] ABSTRACT

A safety bar mechanism and sheet processing device having a safety bar mechanism, with which such an accident that the operator's hand is pinched between a table and peripheral devices etc. can be positively avoided whatever direction an external force exerts. The safety bar mechanism is disposed, for example, above the table on which a sheet is stacked, and comprises detector means the upper end of which is supported on a fixed part such that the detector means pivots freely in forward/backward directions and has play in upward/downward directions. When an external force works on the detector means, thereby moving the detector means upwards, forwards or backwards, a switching means is so operated as to at least stop the upward movement of the table.

33 Claims, 10 Drawing Sheets

SAFETY BAR MECHANISM AND SHEET PROCESSING DEVICE HAVING A SAFETY BAR MECHANISM

This application is a continuation of application Ser. No. 08/114,169 filed Sep. 1, 1993, abandoned Mar. 12, 1996.

TECHNICAL FIELD

The present invention relates to a safety bar mechanism disposed above a vertically movable table on which paper sheets are stacked and a sheet processing device having such a safety bar mechanism. More particularly, the invention relates to a safety bar mechanism and a sheet processing device having a safety bar mechanism which are specially designed to avoid such an accident that the operator's hand is pinched between the table and peripheral devices or the like owing to misoperation by the operator.

BACKGROUND ART

An image forming apparatus in which continuous paper sheets are used as a recording medium, for example, generally employs a stacker unit for stacking printed or copied sheets thereon. The stacker unit includes a table on which printed or copied sheets are stacked, and the table has the capability of stably stacking sheets and is constructed to be vertically movable for enabling the sheets accumulated on the table to be taken out of the apparatus.

In such an image forming apparatus, there is always the danger of pinching the operator's hand between the upper face of the table being lifted or the upper face of the sheets stacked on the table and the lower end of the front panel of the stacker unit or the peripheral devices, if the operator puts, by mistake, his hand in the interior of the stacker unit when the apparatus is in operation or if the operator presses, by mistake, a press button for lifting the table when he takes printed or copied sheets out of the stacker unit. For avoiding such an accident, conventional apparatus having such a stacker unit are provided with a safety bar mechanism at the lower end of the front panel of the stacker unit.

One example of prior art safety bar mechanisms is shown in FIGS. 11 and 12. This safety bar mechanism is disposed above a vertically movable table on which sheets are stacked and comprises a safety bar 103. The safety bar 103 has brackets 101,102 fixedly attached to both ends thereof and serves as a detector, taking the form of a bar bent at two points between the both ends. The brackets 101 and 102 are pierced to form holes 101a, 102a with their axes extending in the same direction as the longitudinal direction of the safety bar 103, and supporting shafts (not shown) attached to a fixed member are loosely inserted in these holes 101a, 102a. A micro switch 104 operated by either of the brackets (in this case, bracket 101) is disposed adjacently to the bracket 101. The micro switch 104 is electrically connected to a driver circuit for vertically moving the table.

With the above-described arrangement, the safety bar 103 is usually held at the position indicated by the two-dot chain line in FIG. 12 by its own weight and the micro switch 104 is accordingly pressed by the bracket 101 and turned ON. In this condition, in the event that the lower end of the safety bar 103 is touched by a hand or the like, the safety bar 103 will pivot on the two supporting shafts upwardly in a backward direction as indicated by the arrow in FIG. 12. The bracket 101 also pivots upwardly in a backward direction as indicated by the arrow in FIG. 12. This causes a lever 104a of the micro switch 104 to pivot to the position indicated by the solid line in FIG. 12, whereby the micro switch 104 is turned OFF and the rising table located under the safety bar 13 stops and then begins to lower. Thus, the accident of pinching the operator's hand between the table and the peripheral devices etc. can be avoided.

DISCLOSURE OF THE INVENTION

According to the above-described prior art safety bar mechanism, the micro switch is turned OFF only when the safety bar is moved upwardly in a backward direction. However, supposing a situation where a hand is pinched between the upper face of the table and the lower end of the front panel of the stacker unit, it is preferable that the safety bar possibly moves in every direction and that the safety bar mechanism surely detects pinching of a hand under any circumstances.

With the above point in view, the invention aims to provide a safety bar mechanism and a sheet processing device having a safety bar mechanism, with which the accidents such as, for example, pinching of a hand between the table and the peripheral devices etc. can be positively avoided whatever direction an external force works on.

In order to accomplish the above object, a safety bar mechanism according to the invention comprises:

detector means that is so held at a fixed part as to move at least forwards, backwards, upwards and downwards; and switching means for detecting the movement of the detector means from a normal position by the effect of an external force.

Preferably, the detector means is formed integrally with operating means for operating the switching means when the detector means moves upwards, forwards or backwards from the normal position owing to the effect of an external force. The operating means may be a cam member for turning the switching means ON when the detector means is at its normal position and turning the switching means OFF when the detector means moves upwards, forwards or backwards receiving an external force.

The switching means is preferably fixedly attached to the fixed part, being integral therewith.

Preferably, the upper part of the detector means is forked and the upper ends of the respective forked portions are supported on the fixed part with play in upward/downward directions.

In such a case, the detector means is preferably supported on the fixed part in such a way that: the upper ends of the detector means framed of a round bar are inserted into vertically elongated holes defined in the fixed part.

Preferably, the cam member includes a pair of cams laterally disposed and there are provided two switching means, each being opposite to each of the cams. These switching means may be electrically connected to each other in series.

The detector means is preferably provided with elastic means for imparting an energizing force to the detector means so that the detector means is always held at its normal position. The elastic means in this case may be a extension spring extended between the fixed part and the detector means. Preferably, there may be provided two elastic means laterally aligned.

Further, the fixed part is preferably provided with shock absorbers such as sponges for attenuating the back-and-forth oscillation of the detector means, the oscillation occurring when the detector means returns to the normal position from a front position or back position to which the detector means has moved. There may be provided two shock absorbers opposite to the detector means. More specifically, one of the shock absorbers is positioned in front of the detector means whilst the other is at the back of the detector means, both facing to the detector means.

In the above safety bar mechanism, the detector means is usually held at its normal position, where the means is suspended in a vertical direction, by its own weight or by its own weight plus the energizing force of the elastic means such as extension springs, whereby the switching means is pressed and kept, e.g., in its ON state. In this condition, if the lower end of the detector means is touched by the operator's hand etc. so that the detector means moves upwards, forwards or backwards, the switching means which has been pressed is turned, e.g., OFF as the detector means moves. If a table disposed under the detector means is, for example, on the way of its upward movement at that time, the upward movement is halted by turning OFF of the switching means, thereby ensuring safety for the operator. Further, when the external force exerted on the detector means is eliminated, the detector means returns to its initial, normal position.

The upper end of the detector means is so supported on the fixed part that the detector means pivots freely in forward/backward directions and has play in upward/downward directions. Moreover, the detector means is so arranged that the switching means is positively turned OFF by the operating means whatever movement the detector means does. Therefore, the switching means will be turned OFF, and, e.g., the upward movement of the table disposed under the detector means will be stopped whatever direction an external force exerts on the detector means.

In the safety bar mechanism, the upper part of the detector means is forked and the upper ends of the respective forked portions are supported by the fixed part. Further, there are two operating means, laterally disposed, relative to the above supported parts of the detector means and two switching means are disposed relative to these operating means. With this arrangement, even when an external force exerts in the vicinity of a lengthwise end of the detector means from the underside, the end of the detector means on the side at which the external force has exerted is moved upwards and thus the corresponding switching means is operated, whereby an accident such as pinching of a hand can be positively avoided.

A sheet processing device having a safety bar mechanism according to the invention comprises:

(a) a stacker mechanism including a folding mechanism for folding a continuous sheet; a table on which the continuous sheet folded by the folding mechanism is stacked; a cover for covering the front face of the folding mechanism; and table driving means for moving the table between a folding position where the table is located in the vicinity of the lower edge of the cover and a taking-out position where the continuous sheet stacked on the table is taken out; and (b) a safety bar mechanism including detector means which is disposed in the vicinity of the lower edge of the cover and so held on a fixed part as to move at least in forward/backward directions and upward/downward directions; and switching means for detecting that the detector means has been moved from its normal position by the effect of an external force.

The sheet processing device may be provided with the safety bar mechanism having the arrangement described above.

The lower end of the detector means preferably has at least the same length as that of one side of an aperture for operation located underneath the cover.

In the detector means, the part opposite to a grip of the table may take the form of a recess and the part opposite to a sensor box disposed above the detector means may be bent downwards.

When the switching means is in its OFF state, at least the upward movement of the table may be stopped, or alternatively, the upward movement of the table is stopped and then the table may be lowered.

Other objects of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and accompanying drawings which are given by way of illustration only, and thus are not limitative of the present invention, and wherein:

FIG. 1 is a partly broken-out front view of an image forming apparatus according to one embodiment of the invention;

FIG. 2 is an enlarged front view of a stacker unit of the image forming apparatus according to the embodiment of the invention;

FIG. 3 is a front view of a safety bar mechanism according to the embodiment of the invention;

FIG. 4 is a plan view of the safety bar mechanism according to the embodiment of the invention;

FIG. 5 is a side view of the safety bar mechanism according to the embodiment of the invention;

FIG. 6 is a view I for illustrating the operation of the safety bar mechanism according to the embodiment of the invention;

FIG. 7 is a view II for illustrating the operation of the safety bar mechanism according to the embodiment of the invention;

FIG. 8 is a view III for illustrating the operation of the safety bar mechanism according to the embodiment of the invention;

FIG. 9 is a view IV for illustrating the operation of the safety bar mechanism according to the embodiment of the invention;

FIG. 10 is a sectional view showing a modified example of the safety bar mechanism according to the embodiment of the invention;

FIG. 11 is a perspective view of a prior art safety bar mechanism; and

FIG. 12 is a view showing the switching operation of a prior art safety bar mechanism.

BEST MODE FOR CARRYING OUT THE INVENTION

Figure 1:
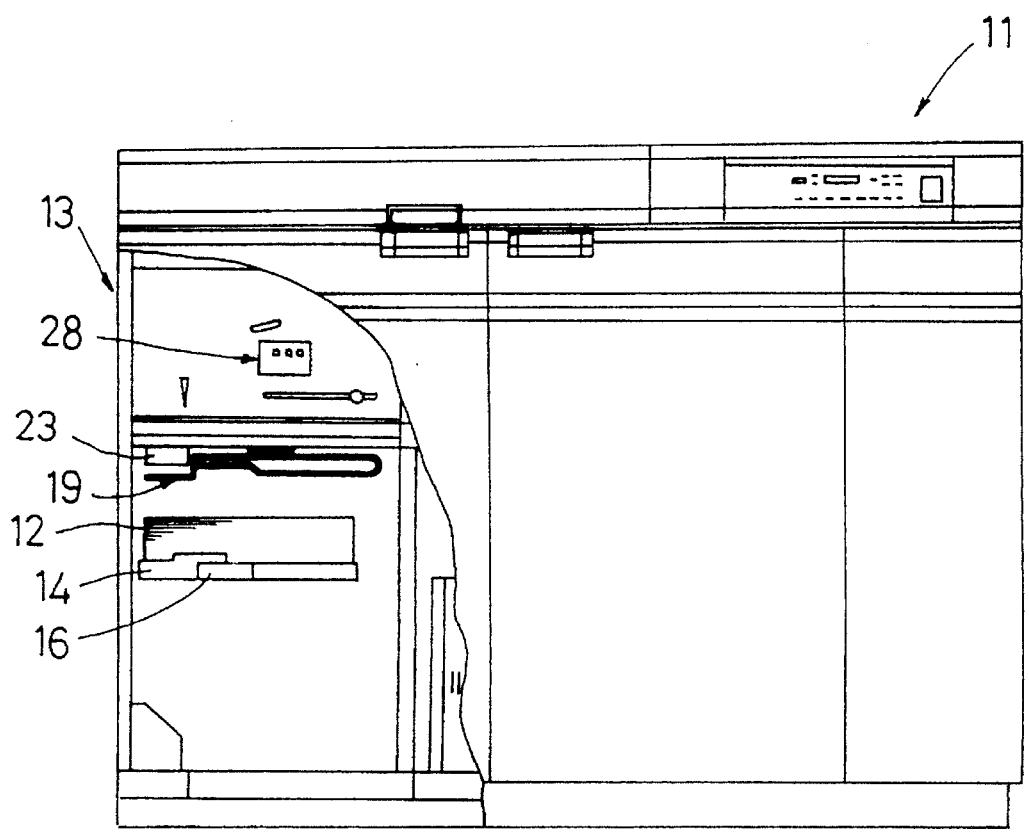
FIGS. 1 to 12 are for illustrating preferred embodiments of a safety bar mechanism and a sheet processing device having a safety bar mechanism according to the invention.

Referring now to the drawings, a safety bar mechanism and a sheet processing device having a safety bar mechanism according to preferred embodiments of the invention will be hereinafter described.

Figure 2:
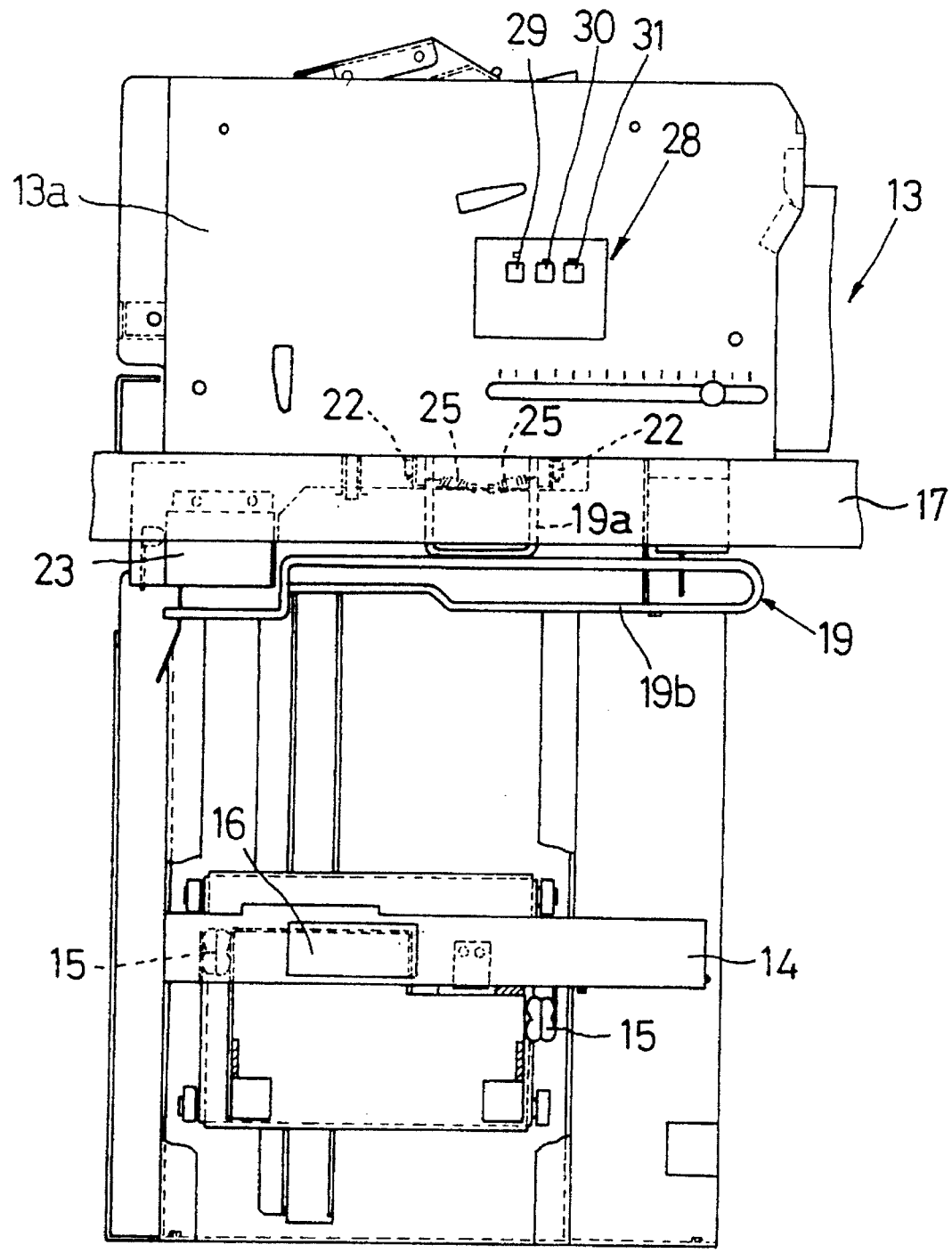

FIG. 1 shows a partly broken-out front view of an image forming apparatus in which a safety bar mechanism according to one embodiment of the invention is incorporated, and FIG. 2 shows an enlarged front view of a stacker unit employed in the image forming apparatus. An image forming apparatus 11 of this embodiment uses a continuous sheet as a recording medium and has a stacker unit 13 for sequentially stacking a series of sheet 12, which has been printed or copied, thereon. The stacker unit 13 includes a table 14 onto which the sheet (continuous sheet) 12 is continuously mounted and stacked, while being folded according to perforations provided thereon. In order to stack the sheet 12 on the table 14 stably and to enable the sheet 12 to be taken out easily in specified quantity which has been accumulated on the table 14, the table 14 is designed to be moved up and down by table driving means such as a motor or chain mechanism. There is disposed a folding mechanism (not shown in FIGS. 1 and 2) over the table 14. The folding mechanism folds the sheet 12 in accordance with perforations and mounts it on the table 14. During the time when the image forming apparatus 11 is in operation, the table 14 repeatedly moves up and down in order to increase the efficiency in folding the sheet 12. This up and down movement of the table 14 is substantially synchronous with folding of pages of the sheet 12 and always moves up and down. For protecting the operator and other mechanisms from the repeated up and down movement as well as ensuring this movement, a cover 13a is provided over the front face of the stacker unit 13. Disposed at the front end face of the table 14 is a grip 16 used for sliding the table 14 along laterally aligned slide rails 15 in a forward direction when taking the stacked sheet 12 out of the table 14.

Figure 3:
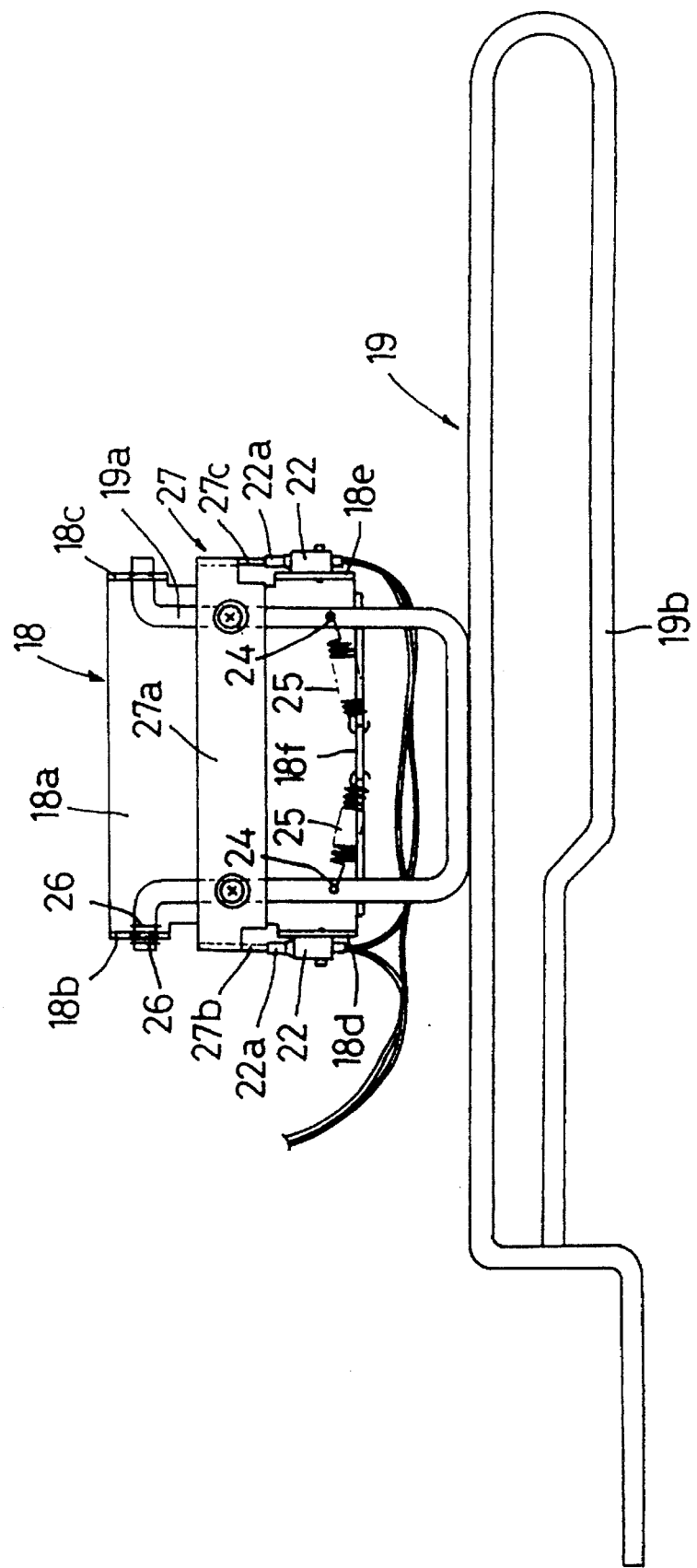
Figure 4:
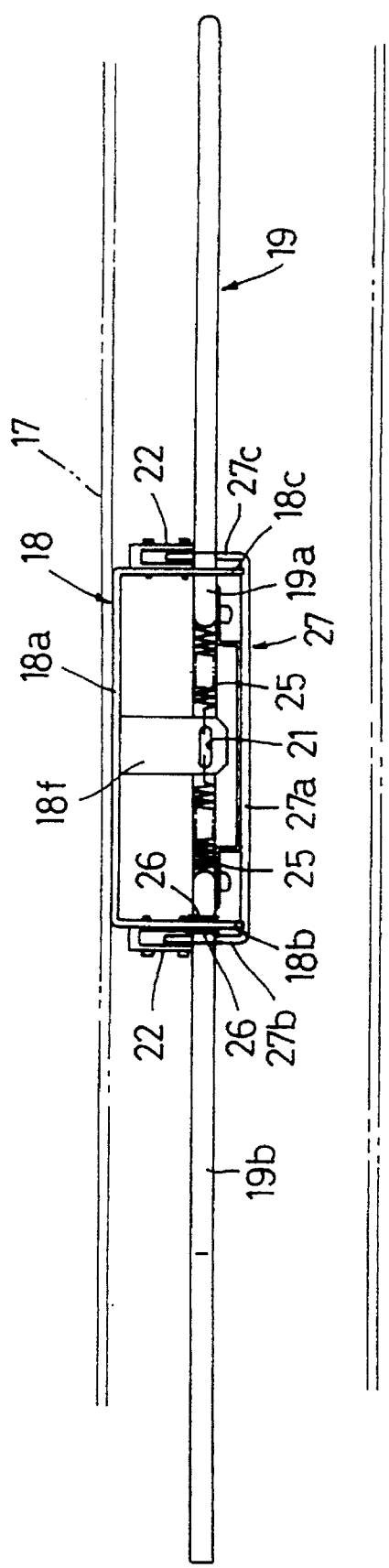
Figure 5:
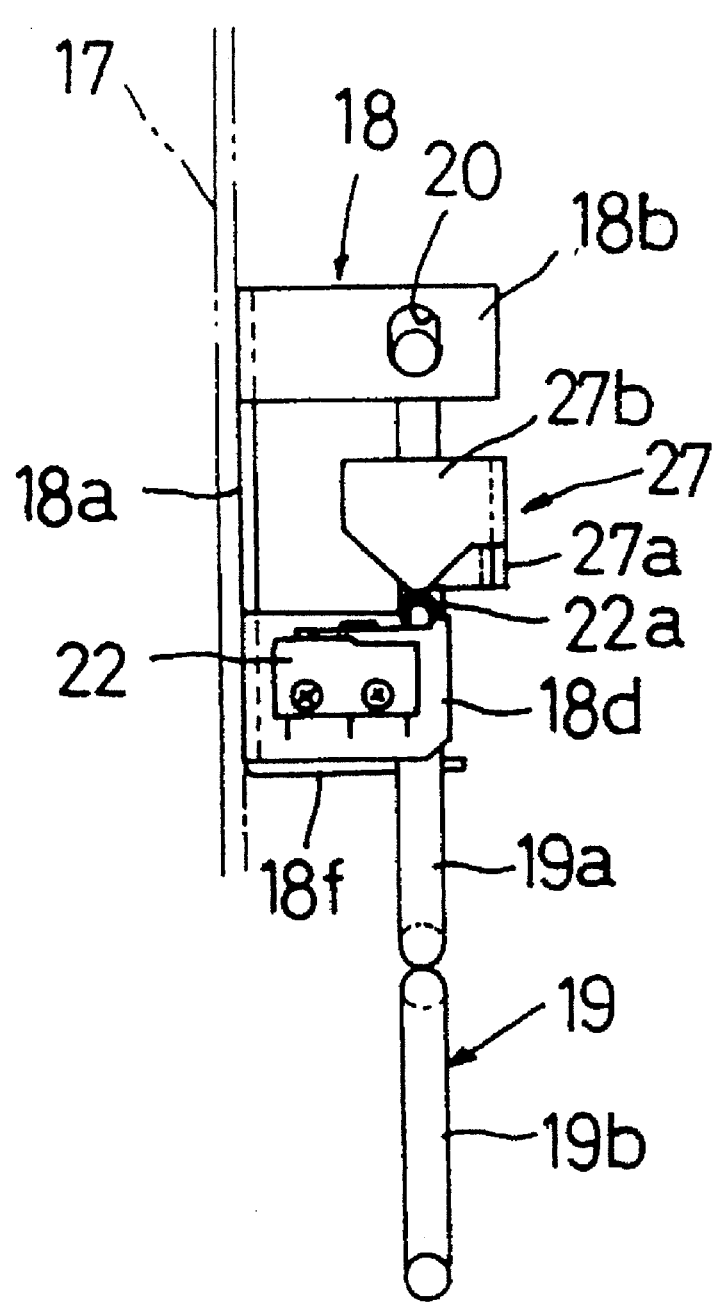

FIGS. 3, 4 and 5 show a front view, plan view and side view of the safety bar mechanism according to the embodiment, respectively. The safety bar mechanism of the embodiment is disposed above the table 14, being secured to an attachment board 17 oriented in a vertical direction in the stacker unit 13. This safety bar mechanism includes a sheet-like fixed member 18 and a round-bar shaped detector bar 19 supported by the fixed member 18.

The fixed member 18 is constructed to have a substantially rectangular back plate 18a closely, fixedly attached to the attachment board 17 and five supporting plates 18b to 18f which are formed by bending the upper and lower end parts of each of the right and left sides and the central part of the lower end of the back plate 18a. Of these supporting plates, the supporting plates 18b and 18c, which are formed by bending the upper end parts of the sides of the back plate 18a, have a vertically elongated hole 20 respectively in order to hang and support the detector bar 19 at a position close to their respective leading ends. The supporting plate 18f formed by bending the central part of the lower end of the back plate 18a is pierced to form an elongated hole 21 for engaging with one end of each of extension springs 25 (to be described later). Each of the supporting plates 18d and 18e formed by bending the lower ends of the sides of the back plate 18a is provided with a micro switch 22 at the outer side thereof, having an actuator. These micro switches 22 are turned ON when rollers 22a attached to the respective leading ends of levers are pressed down and turned OFF when the rollers 22a are released from their pressed-down state. The two micro switches 22 are electrically connected in series and further electrically connected to a driver circuit for moving the table 14 in upward/downward directions. When the table 14 is in an automatic operation mode, if at least either of the micro switches 22 is turned OFF, the table 14 in upward movement will be stopped and then lowered.

The detector bar 19 is constructed to have an upper portion 19a and a lower portion 19b the centre of which is fixed to the lower end of the upper portion 19a. The whole configuration of the upper portion 19a substantially takes the form of "U" and its both ends are bent outwardly, whilst the whole configuration of the lower portion 19b substantially takes the form of an elongated ring and the lower portion 19b extends in a lateral direction. The lateral length of the lower portion 19b is at least the same as that of the table 14. One end of the lower portion 19b is bent downwards in the form of a crank so as to avoid being contact with a sensor box 23 (see FIG. 1) disposed above the lower portion 19b, and a portion adjacent to the bent portion takes the form of a recess so that it can avoid being contact with the grip 16 of the table 14. The upper portion 19a is provided with spring engaging holes 24 at the right and left and the extension springs 25 are extended between these spring engaging holes 24 and the elongated hole 21 defined in the supporting plate 18f, respectively.

The detector bar 19 having the arrangement described above is suspended and supported by the supporting plates 18b and 18c of the fixed member 18, with the upper ends of the detector bar 19 passing through the elongated holes 20 defined in the supporting plates 18b, 18c. Reference numeral 26 in FIGS. 3 and 4 denotes a retainer for preventing slipping-off.

A cam member 27 is attached to the upper portion 19a of the detector bar 19 with screws. The cam member 27 comprises a cam supporting plate 27a disposed along the longitudinal direction of the detector bar 19 and cam plates 27b, 27c which are so formed at both ends of the cam supporting plate 27a that they are bent, with their respective central portions projecting downwards. The projecting portions of the cam plates 27b, 27c press the rollers 22a of their corresponding micro switches 22 down thereby turning the micro switches 22 ON when the detector bar 19 is at its normal position (home position). On the other hand, when the detector bar 19 moves upwards, forwards or backwards, the projecting portions are released from the contact with the rollers 22a, thereby turning the micro switches 22 OFF.

The operation of the safety bar mechanism having the above arrangement will be explained below.

The operation modes for the table 14 disposed in the stacker unit 13 are set through a stacker panel 28 provided at the upper front face of the stacker unit 13. It will be noted that Reference numerals 29, 30, 31 in FIG. 2 denote a table automatic switch, table stop switch and table down switch respectively, and when the image forming apparatus 11 is in normal operation, the table automatic switch 29 is pressed so that the table 14 is set in its automatic state. In this automatic state, the table 14 repeatedly moves up and down while the top of the sheet 12 being folded and mounted on the table 14 is detected by a detector (not shown) and the table 14 lowers as the quantity of the sheet 12 on the table 14 increases so that the top position of the table 14 can be constantly maintained.

In such a normal operating condition, the detector bar 19 of the safety bar mechanism is maintained at the home position where the detector bar 19 is suspended in a vertical direction by its own weight and the energizing force (spring force) of the extension springs 25 as shown in FIGS. 3 to 5. At that time, the laterally disposed micro switches 22 are pressed by the cam plates 27b, 27c of the cam member 27 respectively and the micro switches 22 are accordingly turned ON, whereby the table 14 is continuously operated in its automatic mode.

Figure 6:
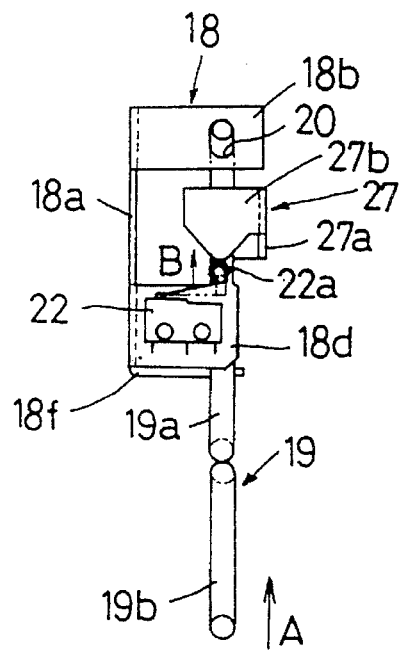

In the above condition, if an obstacle is pinched between the table 14 and the detector bar 19 so that the detector bar 19 is thrust upwards against the spring force of the extension springs 25 as indicated by the arrow A in FIG. 6, the upper ends of the detector bar 19 slide upwards along the respective elongated holes 20 of the supporting plates 18b, 18c, whereby the detector bar 19 moves the same distance as the length of the elongated holes 20. This movement causes the laterally disposed cam plates 27b, 27c to move up so that the rollers 22a of the micro switches 22, which have been in contact with the cam plates 27b, 27c, are raised as indicated by the arrow B in FIG. 6. As a result, the micro switches 22 are turned OFF. Turning OFF of the micro switches 22 allows the table 14 to be stopped and set in its down mode automatically, so that the table 14 lowers. Lowering of the table 14 is continued as long as the micro switches 22 are OFF. When the obstacle is eliminated, the detector bar 19 returns to the home position with the help of the spring force of the extension springs 25. At that time, the micro switches 22 are turned ON, thereby stopping the table 14. For starting the operation of the table 14 after the table 14 has been stopped, it is necessary to press the table automatic switch 29 on the stacker panel 28, thereby setting the table 14 in its automatic mode.

Figure 7:
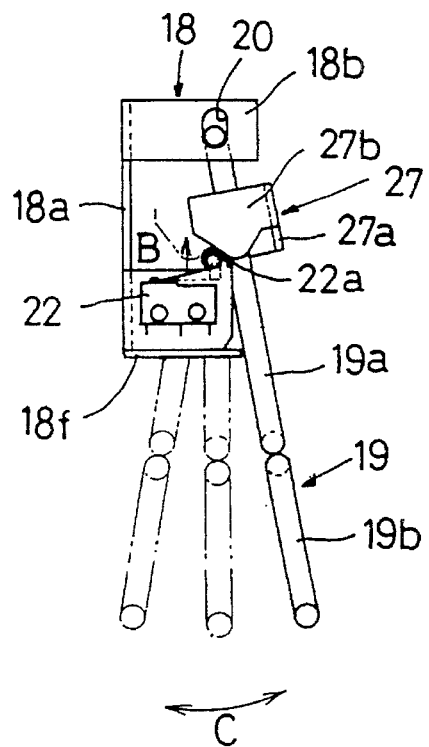
Figure 8:
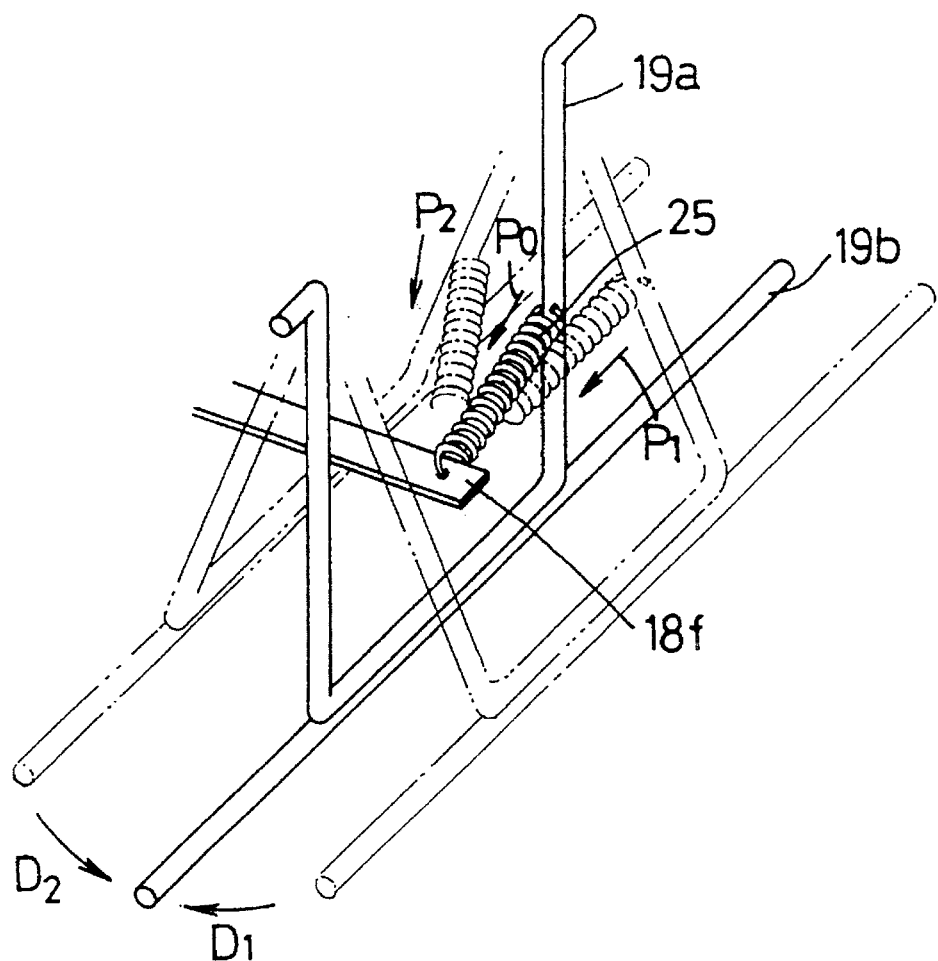

Now there will be given an explanation on the case where an external force works on the detector bar 19 in forward/backward directions as indicated by the arrow C in FIG. 7. In this case, the detector bar 19 swings back and forth about the upper end thereof like a pendulum, being against the spring force of the extension springs 25. With this movement, the laterally disposed cam plate 27a also swings back and forth. Therefore, the projecting portions of the cam plates 27b, 27c are shifted to positions in front of or at the back of the rollers 22a of the micro switches 22 so that the rollers 22a are lifted as indicated by the arrow B in FIG. 7, thereby turning the micro switches 22 OFF. When the micro switches 22 are thus turned OFF, the table 14 is stopped and then lowered in the same manner as described above. When the external force exerted on the detector bar 19 is released, the detector bar 19 returns to the home position with the help of the spring force of the extension springs 25. FIG. 8 shows the conditions of the extension springs 25 when the detector bar 19 is at the home position, the front position and the back position (only one extension spring is shown). In FIG. 8, the relationship between the spring force $P_0$ when the detector bar 19 is at the home position and the spring forces $P_1$, $P_2$ when the detector bar 19 moves forwards or backwards is described by: $P_0 > P_1$, $P_0 > P_2$, and therefore forces exerting in the direction of the arrows $D_1$, $D_2$ always work on the detector bar 19 to return the detector bar 19 to the home position indicated by the solid line.

Figure 9:
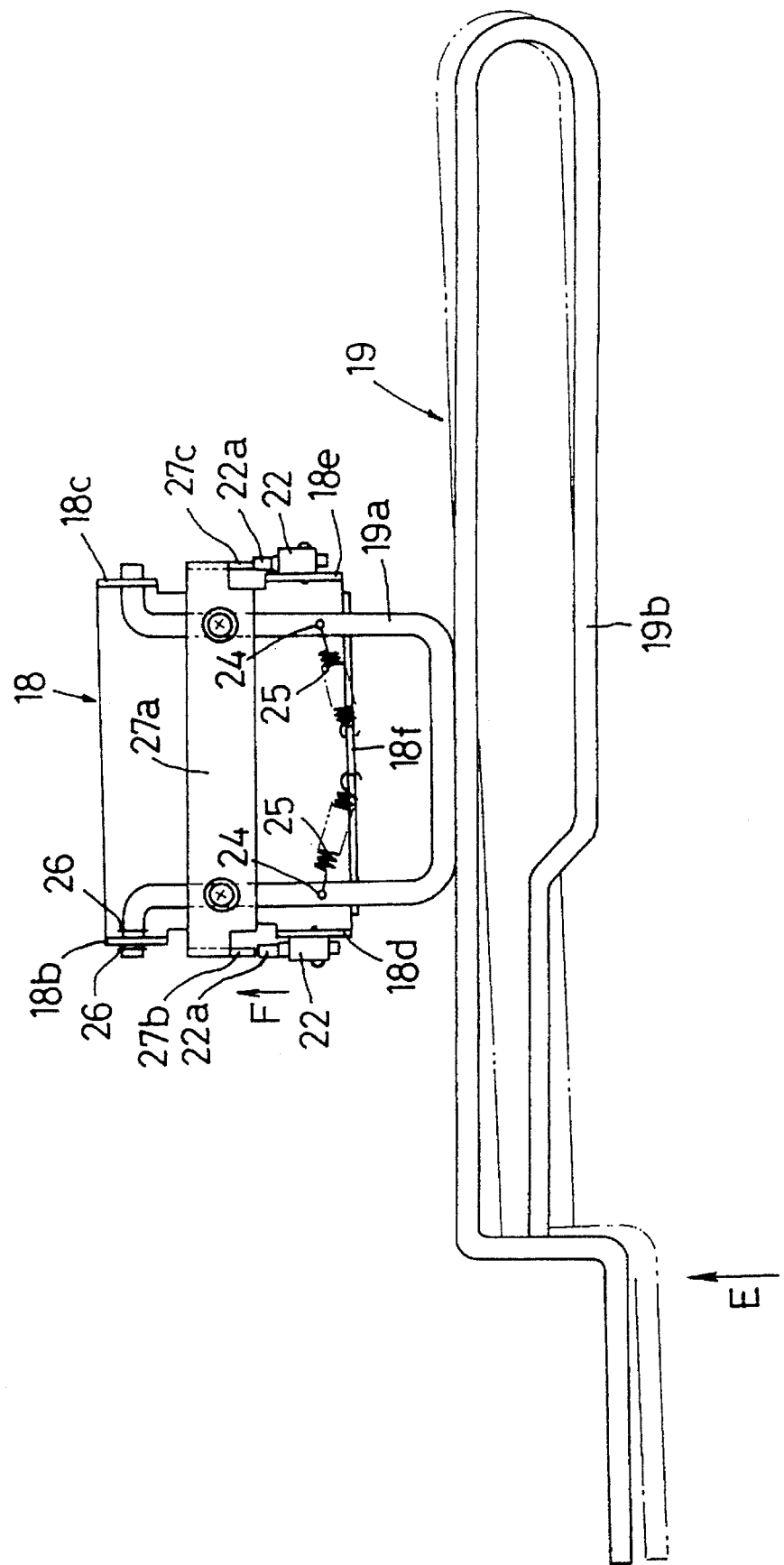

When one end (left end) of the detector bar 19 is thrust upwards as indicated by the arrow E in FIG. 9, the detector bar 19 inclines to the right from the left as shown in FIG. 9 and the cam member 27 inclines likewise. This allows only the left cam plate 27b to move upwards and allows the roller 22a of the left micro switch 22 which has been in contact with the cam plate 27b to rise as indicated by the arrow F in FIG. 9, resulting in turning OFF of the micro switch 22. As described above, even when either of the micro switches 22 is turned OFF, the table 14 can be stopped and then lowered.

In the foregoing description, the invention has been particularly described with the case where the apparatus is in operation, but the table 14 can be also stopped and lowered in the same manner as described above when the button for lifting the table 14 is pressed by mistake under the condition the apparatus is out of operation.

According to the above embodiment, when an external force is exerted on the detector bar 19, the detector bar freely moves upwards (in a vertical direction), forwards or backwards from the home position, and the micro switches 22 are positively turned OFF by the cam member 27 during the movement of the detector bar 19, thereby stopping and lowering the table 14. With this arrangement, in the event that the operator puts his hand in the stacker unit 13 by mistake during the operation of the apparatus or that the button for lifting the table 14 is pressed by mistake when sheets which have been printed or copied are taken out of the stacker unit 13, such an accident that the operator's hand is pinched between the table 14 being lifted and the peripheral devices can be avoided.

Figure 10:
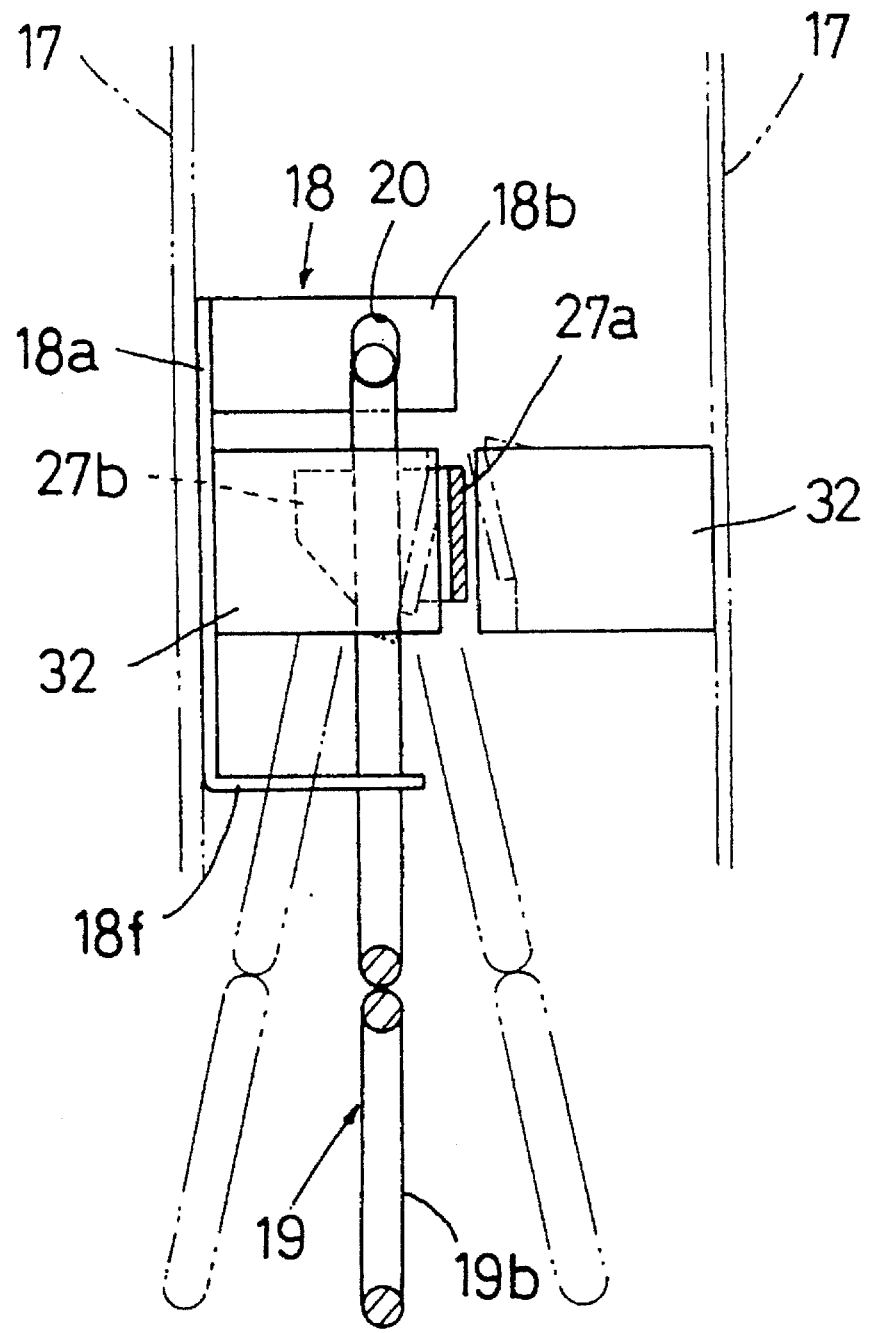
Figure 11:
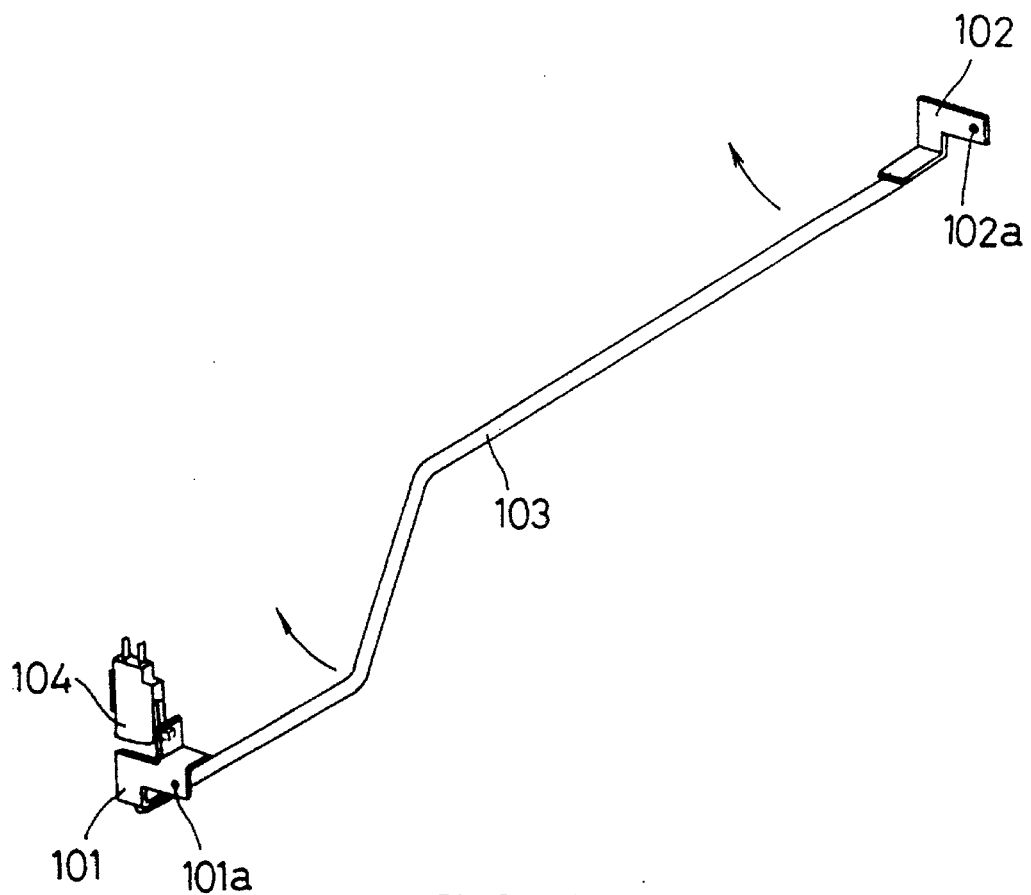
Figure 12:
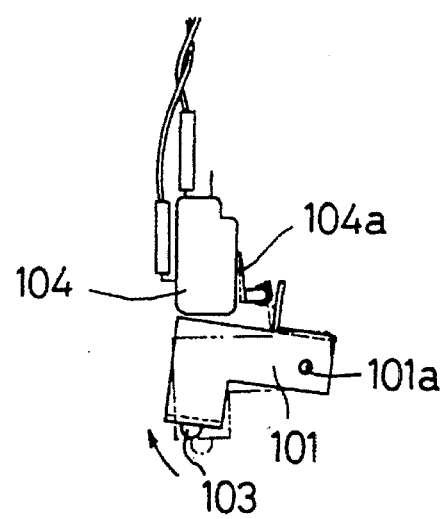

With reference to FIG. 10, a modified example of the invention will be described. In this example, the front and back attachment boards 17 which are opposite to the cam supporting plate 27a of the cam member 27 are provided with shock absorbers 32 such as sponges having a prismatic or cylindrical shape. The provision of the shock absorbers 32 enables it to promptly attenuate the oscillation which occurs in forward/backward directions when the detector bar 19 returns from the front or back position indicated by the two-dot chain line in FIG. 10 to the home position indicated by the solid line.

It is to be noted that the image forming apparatus mentioned above may be a printer, facsimile, or copying machine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A safety bar mechanism comprising:
    detector means for sensing an external force applied to a safety bar wherein said detector means, having respective upper ends, is held by a fixed part as to be movable in at least forwards, backwards and upwards directions from a normal position and wherein said detector means comprises upper forked ends; and
    switching means for detecting movement of the detector means from a normal position, caused by the effect of said external force and wherein each respective upper forked end of the detector means is supported on the fixed part so as to be movable in an upward direction with respect to when the detector means is at the normal position.

2. The safety bar mechanism as claimed in claim 1, wherein the detector means is formed integrally with operating means for operating the switching means when the detector means moves upwards, forwards or backwards from the normal position owing to the effect of an external force.

3. The safety bar mechanism as claimed in claim 2, wherein the operating means is a cam member for turning the switching means ON when the detector means is at its normal position and turning the switching means OFF when the detector means moves upwards, forwards or backwards from the normal position owing to the effect of an external force.

4. The safety bar mechanism as claimed in any one of claims 1 to 3, wherein the switching means is fixedly attached to the fixed part, being integral therewith.

5. The safety bar mechanism as claimed in any one of claims 1 to 3, wherein an upper part of the detector means is forked and each respective upper end of the forked portions is supported on the fixed part.

6. The safety bar mechanism as claimed in claim 5, wherein the detector means is supported on the fixed part in such a way that the upper ends of the detector means are framed of a round bar and are each inserted into a respective vertically elongated hole defined in the fixed part.

7. The safety bar mechanism as claimed in claim 3, wherein the cam member comprises a pair of cams laterally disposed and the switching means and comprises a pair of switching means wherein said pairs of switching means are disposed on opposite sides of the laterally disposed cams.

8. The safety bar mechanism as claimed in claim 7, wherein the two switching means are electrically connected to each other in series.

9. The safety bar mechanism as claimed in any one of claims 1 to 3, wherein the detector means is provided with an elastic means for imparting an energizing force to the detector means so that the detector means seeks equilibrium at its normal position.

10. The safety bar mechanism as claimed in claim 9, wherein the elastic means comprises an extension spring extended between the fixed part and the detector means.

11. The safety bar mechanism as claimed in claim 9, wherein there are provided two elastic means laterally aligned with respect to each other.

12. The safety bar mechanism as claimed in any one of claims 1 to 3, wherein the fixed part comprises shock absorbers for attenuating back-and-forth oscillation of the detector means, the oscillation occurring when the detector means returns to the normal position from a front or back position to which the detector means has moved.

13. The safety bar mechanism as claimed in claim 12, wherein the shock absorbers are sponges.

14. The safety bar mechanism as claimed in claim 12, wherein one of the shock absorbers is positioned in front of the detector means while the other shock absorber is positioned in back of the detector means and wherein, both shock absorbers face the detector means.

15. A sheet processing device comprising:
  (a) a stacker mechanism comprising a folding mechanism for folding a continuous sheet: a table on which the continuous sheet folded by the folding mechanism is stacked; a cover for covering a front face of the folding mechanism; and a table driving means for moving the table between a folding position where the table is located in the vicinity of a lower edge of the cover and a taking-out position where the continuous sheet stacked on the table is taken out; and
  (b) a safety bar mechanism comprising detector means for sensing an external force applied to a safety bar wherein said detector means, having respective upper ends, is disposed in the vicinity of the lower edge of the cover and so held on a fixed part as to be movable in at least forwards, backwards and upwards directions from a normal position; and switching means for detecting that the detector means has been moved from a normal position caused by the effect of the external force wherein said detector means comprises respective forked upper ends supported on the fixed part so as to be movable in an upward direction with respect to when the detector means is at the normal position.

16. The sheet processing device as claimed in claim 15, wherein a lower end of the detector means has at least a same length as the width of a table.

17. The sheet processing device as claimed in claim 15 or 16, wherein the table has a first side and a second side and wherein said first side of said table has a grip for manipulating the table from a closed position to an open position and the second side is disposed opposite said first side across the table and wherein the detector means has a recess disposed in the detector means adjacent to said second side of the table when the table is in the closed position.

18. The sheet processing device as claimed in any one of claims 15 to 16, wherein the detector means has a part bent downwards at a position opposite to a sensor box disposed above the detector means.

19. The sheet processing device as claimed in any one of claims 15 to 16, wherein the detector means is formed integrally with operating means for operating the switching means when the detector means moves upwards, forwards or backwards from the normal position owing to the effect of an external force.

20. The sheet processing device as claimed in claim 19, wherein the operating means is a cam member for turning the switching means ON when the detector means is at the normal position and turning the switching means OFF when the detector means moves upwards, forwards or backwards owing to the effect of an external force.

21. The sheet processing device as claimed in any one of claims 15 to 16, wherein the switching means is fixedly attached to the fixed part, being integral therewith.

22. The sheet processing device as claimed in any one of claims 15 to 16, wherein an upper part of the detector means is forked and each respective upper end of the forked portions is supported on the fixed part.

23. The sheet processing device as claimed in claim 22, wherein the detector means is supported on the fixed part in such a way that the upper ends of the detector means are framed of a round bar and are each inserted into a respective vertically elongated hole defined in the fixed part.

24. The sheet processing device as claimed in claim 20, wherein the cam member comprises a pair of cams laterally disposed and the switching means comprises a pair of switching means wherein said pair of switching means are disposed on opposite sides of the cams laterally disposed.

25. The sheet processing device as claimed in claim 24, wherein the two switching means are electrically connected to each other in series.

26. The sheet processing device as claimed in any one of claims 15 to 16, wherein the detector means is provided with an elastic means for imparting an energizing force to the detector means so that the detector means seeks equilibrium at its normal position.

27. The sheet processing device as claimed in claim 26, wherein the elastic means comprises an extension spring extended between the fixed part and the detector means.

28. The sheet processing device as claimed in claim 26, wherein there are provided two elastic means laterally aligned with respect to each other.

29. The sheet processing device as claimed in any one of claims 15 to 16, wherein the fixed part comprising shock absorbers for attenuating back-and-forth oscillation of the detector means, the oscillation occurring when the detector means returns to the normal position from a front or back position to which the detector means has moved.

30. The sheet processing device as claimed in claim 29, wherein the shock absorbers are sponges.

31. The sheet processing device as claimed in claim 29, wherein one of the shock absorbers is positioned in front of the detector means while the other shock absorber is positioned in back of the detector means, and wherein both shock absorbers face the detector means.

32. The sheet processing device as claimed in any one of claims 15 to 16, wherein the switching means at least stops the upward movement of the table when it is turned OFF.

33. The sheet processing device as claimed in any one of claims 15 to 16, wherein the switching means stops the upward movement of the table and then lowers the table when it is turned OFF.

* * * * *